United States Patent
DiDomenico et al.

[11] Patent Number: 5,821,842
[45] Date of Patent: Oct. 13, 1998

[54] DEFLECTION YOKE LOCKING ARRANGEMENT

[75] Inventors: Gildo DiDomenico, Polleferro; Paolo Spina, Ferentino, both of Italy; Anthony Stanley Baran, Lancaster, Pa.

[73] Assignee: Videocolor, S.p.A., Anagni, Italy

[21] Appl. No.: 645,541

[22] Filed: May 10, 1996

[51] Int. Cl.$^6$ .............................. H01F 7/00; H04N 5/655
[52] U.S. Cl. ..................... 335/210; 335/212; 335/213; 348/831; 313/440
[58] Field of Search .................................. 335/210, 212, 335/213; 348/829, 830, 831; 313/440

[56] References Cited

U.S. PATENT DOCUMENTS

| | | | |
|---|---|---|---|
| 3,986,156 | 10/1976 | Smith | 335/210 |
| 4,110,793 | 8/1978 | Tajiri | 358/248 |
| 4,117,516 | 9/1978 | Yasuhara | 358/248 |
| 4,195,315 | 3/1980 | Pytlarz et al. | 358/248 |
| 4,338,584 | 7/1982 | Howard | 335/210 |
| 4,360,839 | 11/1982 | Ragland, Jr. et al. | 358/249 |
| 5,028,898 | 7/1991 | Tsukii et al. | 335/210 |
| 5,185,672 | 2/1993 | Rousseau et al. | 358/248 |

FOREIGN PATENT DOCUMENTS

| | | |
|---|---|---|
| 2723143 | 11/1978 | Germany . |
| 3010262 | 9/1981 | Germany . |

OTHER PUBLICATIONS

PCT/US93/12267, filed Dec. 16, 1993, by G.J. Moore, entitled "Method For Mounting A Deflection Yoke And Support Structure Therefor".

*Primary Examiner*—J. R. Scott
*Assistant Examiner*—Raymond Barrera
*Attorney, Agent, or Firm*—Joseph S. Tripoli; Joseph J. Laks; Sammy S. Henig

[57] ABSTRACT

A liner of a deflection yoke is provided with non-threaded sleeves. A slide pin is inserted into the sleeve until a head portion of the pin comes in contact with a funnel of a cathode ray tube on which the yoke is mounted. After adjustment, a wedge is inserted into a hollow part of the pin for expanding radially the wall of the pin. Thereby, the pin is locked within the sleeve. In this way, the position of the yoke relative to the tube is secured.

11 Claims, 4 Drawing Sheets

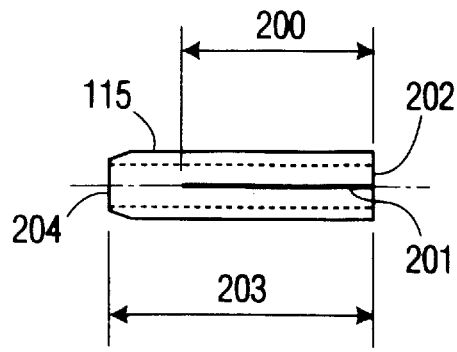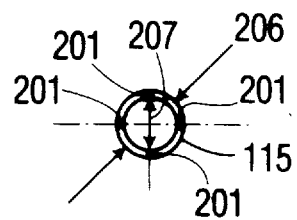
FIG. 5A  FIG. 5B
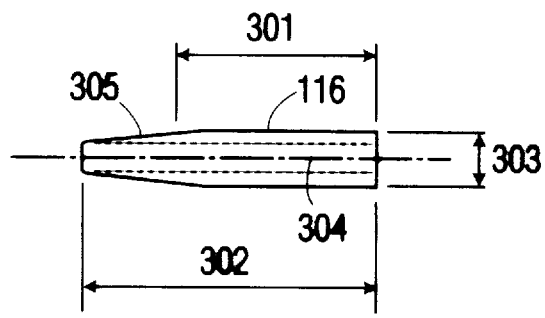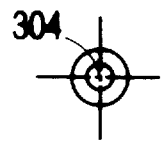
FIG. 6A  FIG. 6B
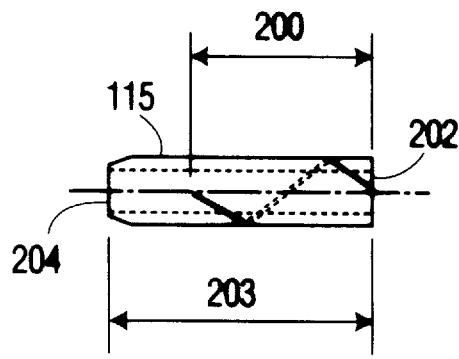
FIG. 7

DEFLECTION YOKE LOCKING ARRANGEMENT

BACKGROUND OF THE INVENTION

1. Field of the Invention

The invention relates to a deflection yoke for a cathode ray tube and more specifically, to an arrangement for locking the yoke to the tube after positioning adjustment of the yoke is completed.

The deflection yoke of a cathode ray tube is placed on the neck of the tube. After adjustment of the yoke relative to the tube has been completed, the yoke is permanently attached or locked to the tube in a manner to prevent further relative movement of the yoke-tube combination. It is desirable to prevent the locking operation from changing the yoke position or geometric shape, so as not to alter the horizontal and vertical deflection fields.

2. Description of the Related Art

U.S. Pat. No. 4,338,584 describes a deflection yoke 1, illustrated in FIG. 1, including a separator 12, generally made of plastic for isolating the horizontal deflection coils 13 from the vertical deflection coils 14. A ring-shaped rear part 5 is secured by clamp 6 on neck 3 of the tube. The front part 8 of the deflection yoke is locked in position after adjustment by pins 9 with teeth 10. Pins 9 are able to move inside bushing 7 toward the flared part 4 of the tube. The bushing forms an integral part of the separator. Teeth 10 mesh with notched part 11 of the bushing to prevent rearward movement of pin 9.

Disadvantageously, pin 9 moves by fixed increments and not by continuous or gradual displacement. Such an arrangement may not always allow the front of the deflection yoke to be held in a given (e.g., intermediate) position, causing either a jump, if the pin is not in contact with surface 4, or a reaction force, pushing back on the front of the separator. Because of the flexibility of the separator, the reaction force produces a change in the position of the deflection coils relative to the tube. Another disadvantage is that it is no longer possible to move back the pins if they are pushed too far against part 4 of the tube.

In U.S. Pat. No. 5,185,872, a front ring of the separator, shown in FIG. 2, is provided with threaded bushings 24. Threaded pins 26 having contact head 28 are threaded in bushing 24 in a continuous or gradual manner. Disadvantageously, when head 28 is brought in contact with the flared part 4 of the tube, by rotation around the longitudinal axis of the bushing, the torque transmitted may cause rotation of the deflection yoke around the longitudinal axis Z of the tube. Furthermore, when pin 26 is engaged too far in bushing 24, the reaction force transmitted by contact head 28 may deform the flexible front part 8 of the separator, causing movement of the deflection coils relative to the cathode ray tube.

SUMMARY OF THE INVENTION

In accordance with an inventive feature, the pin is translated or made to slide in a non-threaded bushing until the slide pin comes in contact with the flared part of the tube. Then, a wedge with a cross-sectional area greater than a cross-sectional area of a hollow part of the pin is forced into the hollow part. Thus, further relative movement of the pin in the bushing is prevented.

A deflection yoke for a cathode ray tube embodying an aspect of the invention includes a liner. The liner includes a front ring, having an outer section which includes sleeves. In a given sleeve a corresponding pin is received to support a front portion of the deflection yoke on a flared part of the tube. A rear section of the pin is hollow and serves as a housing for a wedge that locks the pin into the given sleeve.

BRIEF DESCRIPTION OF THE DRAWINGS

FIGS. 5A and 5B are longitudinal and side views, respectively, of a pin for fastening the deflection yoke of FIG. 3 or 4 on the flared part of the tube;

FIGS. 6A and 6B are longitudinal and side views, respectively, of a wedge inserted in the pins of FIG. 5A or 5B; and FIG. 7 shows an alternate embodiment of a locking pin for the yoke of FIG. 3 or 4.

DESCRIPTION OF THE PREFERRED EMBODIMENT(S)

Figure 1:
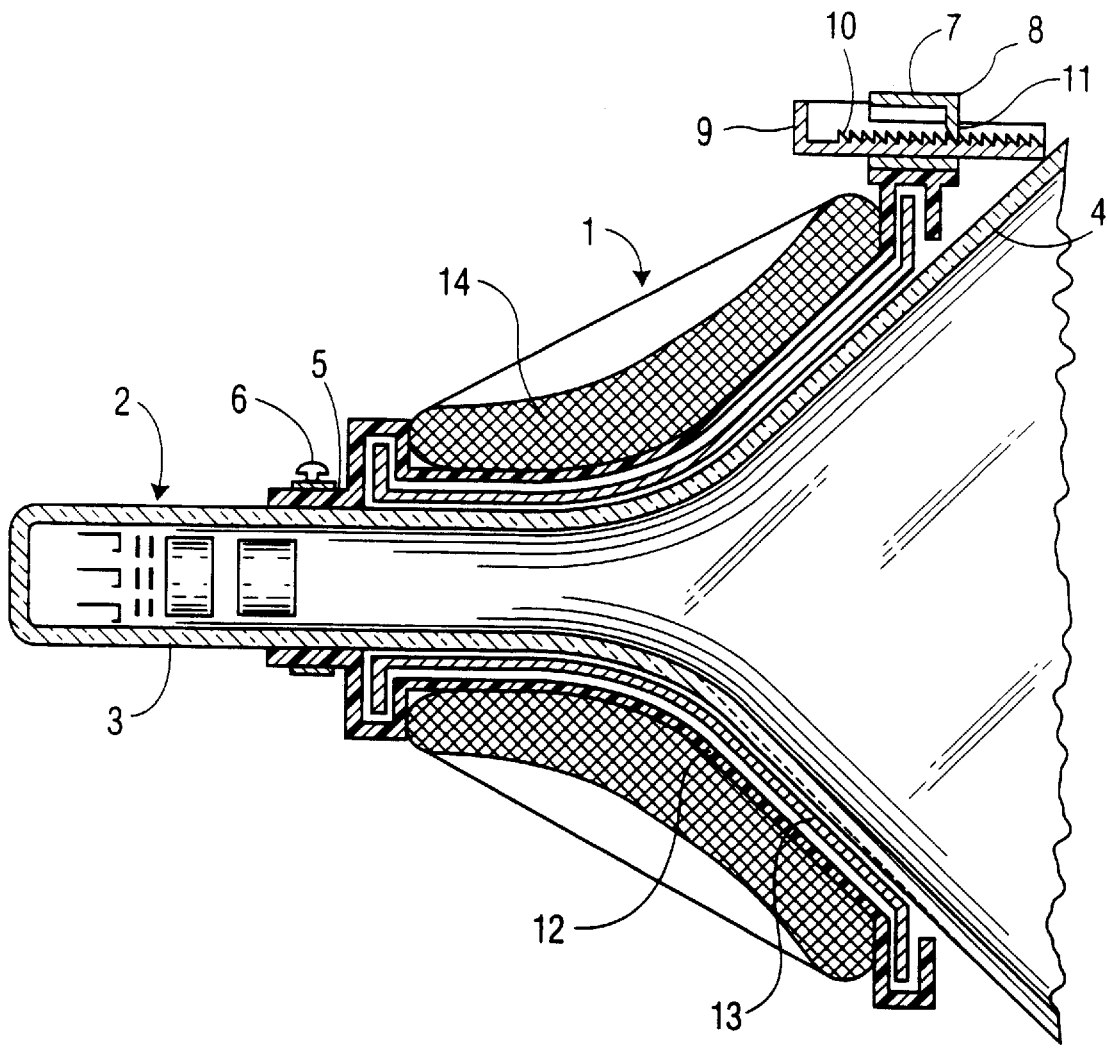
FIG. 1 illustrates a cross section of a prior art deflection yoke mounted on a cathode ray tube.
Figure 2:
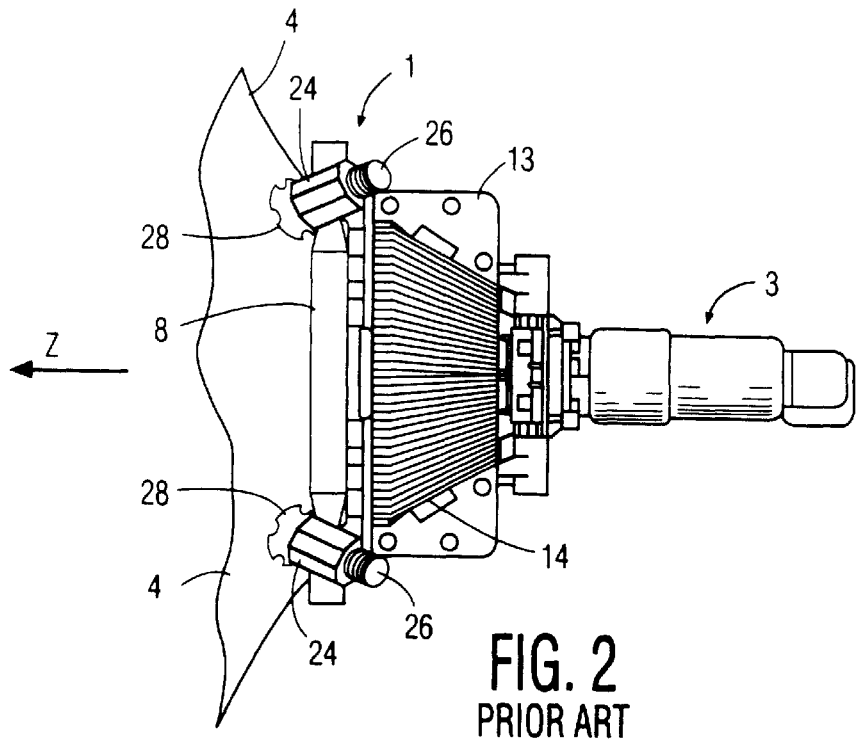
FIG. 2 illustrates a second embodiment of a locking arrangement of a prior art deflection yoke.
Figure 3:
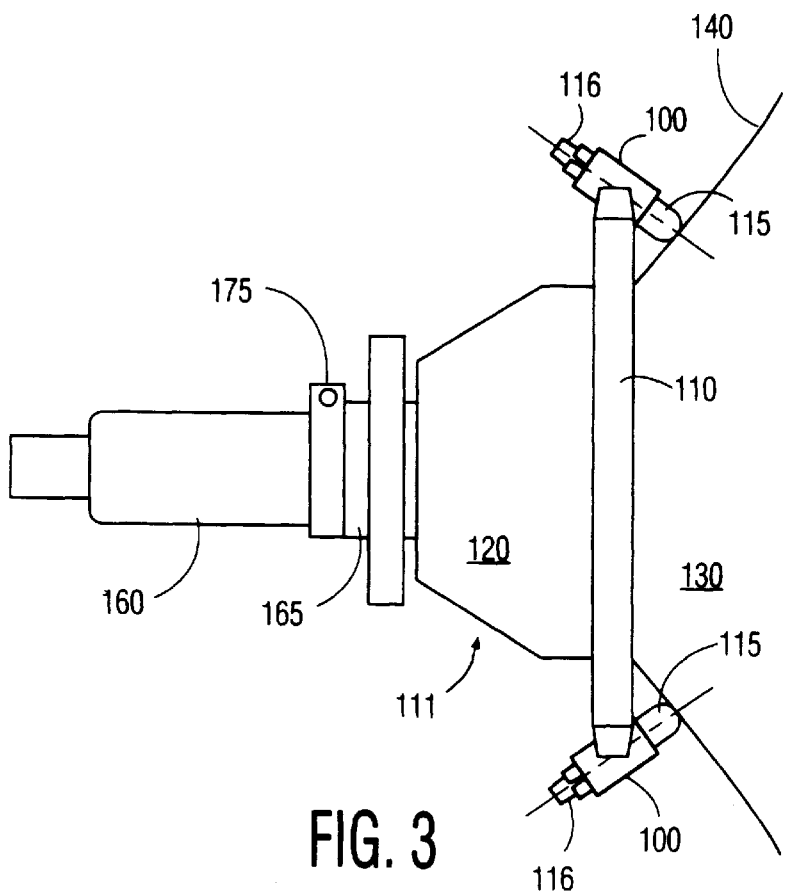
FIG. 3 illustrates a side view of a deflection yoke, embodying an aspect of the invention.

FIG. 3 illustrates a deflection yoke 120, embodying an aspect of the invention, including a yoke liner or separator 111. A cylindrically shaped rear part 165 of separator 111 of deflection yoke 120 is locked on a tube neck 160 by a clamp 175 in a conventional manner. Separator 111 has a front ring 110 that supports sleeves or bushings 100. Inside each of bushing 100, a slide pin 115 is inserted and translated in bushing 100 until a front end of slide pin 115 comes in contact with a flared part 140 of the tube. Pin 115 is locked in position by inserting, in its rear hollow part, a block or wedge 116. Wedge 116 has a cross-sectional area which is greater than that of the hollow part of pin 115.

Figure 4:
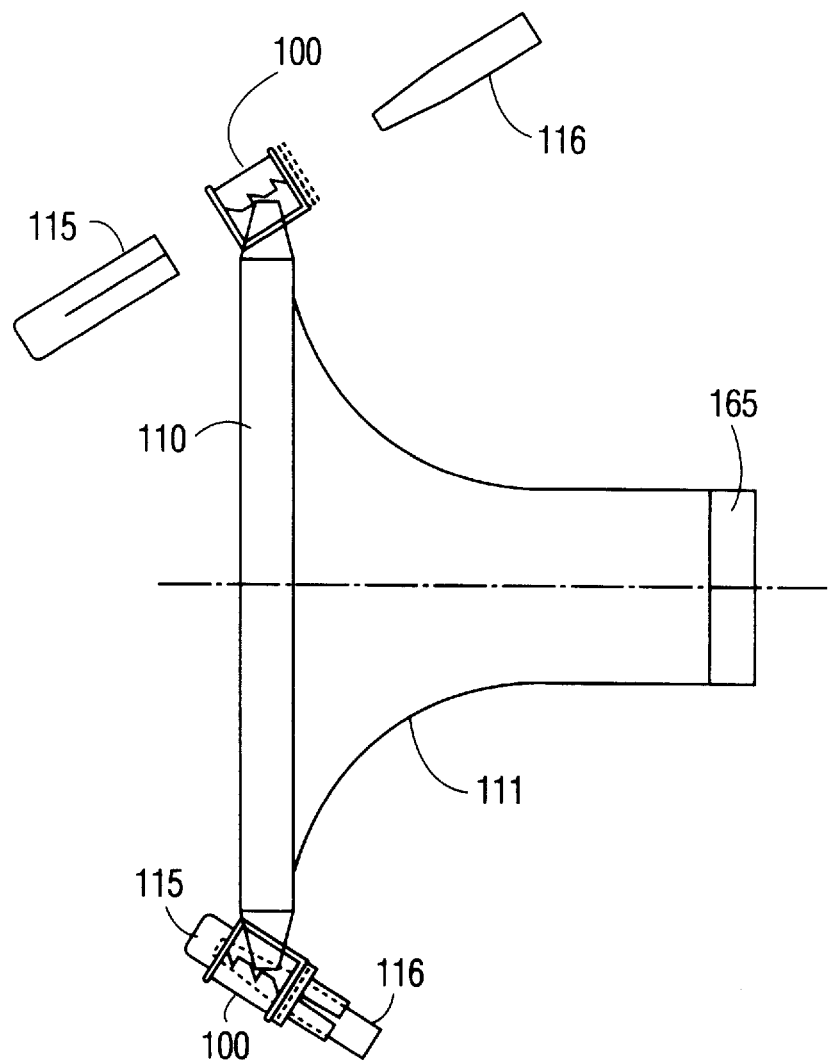
FIG. 4 shows the separator of FIG. 3 and the position locking arrangement in more detail.

FIG. 4 shows the separator of FIG. 3 in a partially exploded view. Similar symbols and numerals in FIGS. 3 and 4 indicate similar items or functions. In FIG. 4, pins 115, supporting the front part 110 of the deflection yoke, are shown before and after being inserted in bushings 100. The locking in position of the yoke is made by the insertion of wedge 116 in the hollow rear part of a given bushing 100.

When the position of the deflection yoke is being adjusted on the tube neck, the yoke is held by an external arrangement, not shown. After slide pins 115 have been inserted in bushings 100, the yoke is locked on tube neck 160 by tightening clamp 175, not shown in FIG. 4. A given wedge 116, which has a larger cross-sectional area than that of the hollow part of pin 115 is initially pushed against pin 115 to bring pin 115 in contact with the tube surface 140. Then, wedge 116 penetrates the hollow part of pin 115 and causes the wall of pin 115 to expand radially. Thereby, pin 115 is locked against the internal walls of bushing 100. Because the deflection yoke is then locked on the tube, the external holding arrangement, not shown, is released and removed. Advantageously, the deflection yoke is, thereby, locked in position without applying any reactive force to ring 110 that could cause the yoke to move or to be deformed, during insertion of the locking wedges 116 in pins 115.

As shown in FIGS. 5A, 5B, 6A, 6B and 7, pins 115 are hollow with an approximately cylindrical shape. Similar symbols and numerals in FIGS. 3, 4, 5A, 5B, 6A, 6B and 7 indicate similar items or functions. Four slots 201 of pin 115 in FIG. 5B are spaced 90 degrees apart and are formed in the wall of the hollow part along a portion 200 of a length 203 of pin 115 of FIG. 5A. Slots 201 extend from a rear part 202 of pin 115 along its longitudinal axis. Slots 201 divide the wall into radially expandable flexible sections.

Locking wedge 116 of FIG. 6A is cylindrically shaped along a portion 301, equal to approximately two-thirds of its length 302. Locking wedge 116 terminates with a tapered front part 305 that facilitates the insertion of wedge 116 in the hollow part of pin 115 and the expansion of the wall sections of pin 115. Advantageously, wedge 116 is provided with a channel 304 for injection of glue. The glue permanently bonds parts 100, 115 and 116 to one another and to the surface of the tube by flow of the glue through opening 204 in pin 115. In an alternate embodiment, such as illustrated in FIG. 7, each pin 115 includes a single slot forming a helical opening coming out at the rear 202 of the pin.

To allow a change of the yoke position on the tube, it may be desirable to release wedge 116 of FIG. 3. This can be done by making wedge 116 longer than the length of the hollow part of pin 115. In this way, when the yoke is held in position on the tube, a portion of wedge 116 protrudes outside of pin 115. Thereby, the withdrawal, if necessary, of wedge 116 by traction on the protruding section is facilitated.

What is claimed is:

1. A deflection yoke for a cathode ray tube, comprising:
   a liner for supporting a deflection winding; and
   a plurality of pins; a wedge and
   a plurality of sleeves disposed on said liner for receiving in a given sleeve a corresponding pin of said pins to support a front portion of said deflection yoke on a flare part of said cathode ray tube, said pin having a hollow rear section for receiving in said hollow rear section said wedge which locks said pin into said sleeve, such that said wedge establishes the position of said pin relative to said sleeve said pin being supported by said flare part and being moveably adjustable relative to said liner for establishing a position of said deflection yoke relative to said cathode ray tube.

2. A deflection yoke according to claim 1 wherein said liner has a front ring and said sleeves are disposed around said ring.

3. A deflection yoke according to claim 1 wherein a portion of said wedge has a cross section larger than said rear hollow section of the pin.

4. A deflection yoke according to claim 3 wherein a wall of said hollow section of said pin comprises at least one slot opening onto a rear end of said pin.

5. A deflection yoke according to claim 4 wherein said slot has a helical shape.

6. A deflection yoke according to claim 1 wherein a front part of said wedge has a tapered shape.

7. A deflection yoke according to claim 1 wherein a rear part of said wedge protrudes outside said hollow rear section of said pin.

8. A deflection yoke according to claim 1 wherein a length of said wedge is greater than a length of said pin.

9. A deflection yoke according to claim 1 wherein said wedge is hollow.

10. Method to hold in position a deflection yoke for a cathode ray tube, said yoke having a front ring for positioning a forward portion of said yoke on a funnel of said tube, said ring having a plurality of sleeves for accommodating pins, said pins linking the deflection yoke to a surface of said tube and capable of moving along a longitudinal axis of said sleeves, said method comprising the steps of:

a) adjusting the position of the deflection yoke with respect to the neck and funnel portions of the tube;

b) attaching a rear section of said yoke to the tube neck;

c) translating the pins into the sleeves in order to cause said pins to come into contact with the funnel; and d) inserting a wedge into a hollow portion of each pin, said wedge having a cross section that is larger, prior to the insertion, than that of a hollow portion of said pin such that said wedge establishes the position of said pin relative to said sleeve.

11. A deflection yoke for a cathode ray tube comprising:
    a liner having a front portion disposed on a funnel of said tube for mounting a deflection winding on said liner;
    a plurality of sleeves disposed on said front portion, each sleeve receiving a corresponding hollow pin linking said deflection yoke to a surface of said tube and capable of moving in said sleeve along a longitudinal axis of said sleeve in order to come in contact with said surface of said cathode ray tube; and
    a wedge associated with said pin for inserting said wedge into a hollow part of said pin, said wedge having a cross section greater, prior to the insertion, than the hollow part so as to radially expand a wall of said pin against an inner wall of the sleeve to lock said pin in said sleeve when said wedge is inserted such that said wedge establishes the position of said pin relative to said sleeve.

\* \* \* \* \*